(12) United States Patent
Borra

(10) Patent No.: US 6,264,816 B1
(45) Date of Patent: Jul. 24, 2001

(54) MACHINE FOR THE ELECTROPHORETIC RE-PAINTING OR RE-VARNISHING OF THIN METAL OBJECTS

(76) Inventor: Giacomo Borra, V.S. Giuliano, 20 44030 Rero (FE) -1, Rero-Tresigallo (IT)

( * ) Notice: Subject to any disclaimer, the term of this patent is extended or adjusted under 35 U.S.C. 154(b) by 0 days.

(21) Appl. No.: 09/465,939

(22) Filed: Dec. 17, 1999

(51) Int. Cl.$^7$ .................................................. B65G 49/02
(52) U.S. Cl. ............................................. 204/623; 204/199
(58) Field of Search ...................................... 204/623, 199

(56) References Cited

U.S. PATENT DOCUMENTS 5,472,592 * 12/1995 Lowery ................................. 204/199

FOREIGN PATENT DOCUMENTS

WO89/10987   11/1989   (WO).
WO94/25645   11/1994   (WO).

* cited by examiner

*Primary Examiner*—Kishor Mayekar
(74) *Attorney, Agent, or Firm*—Nixon & Vanderhye PC; Frank P. Presta

(57) ABSTRACT

The present invention relates to a machine for the electrophoretic painting or varnishing of thin metal objects such as, for example, lids for food containers, comprising a tank for the electrophoretic bath, extending along a longitudinal axis, a conveyor line for the metal objects, immersed in the tank for the electrophoretic bath, an electrode immersed in the bath, and a system of electrodes of opposite polarity to the electrode immersed in the bath, characterized in that it comprises means for securing the metal objects, the securing means being able to keep the plane containing each metal object in a position substantially perpendicular to the direction of movement of the conveyor line for the lids.

14 Claims, 5 Drawing Sheets

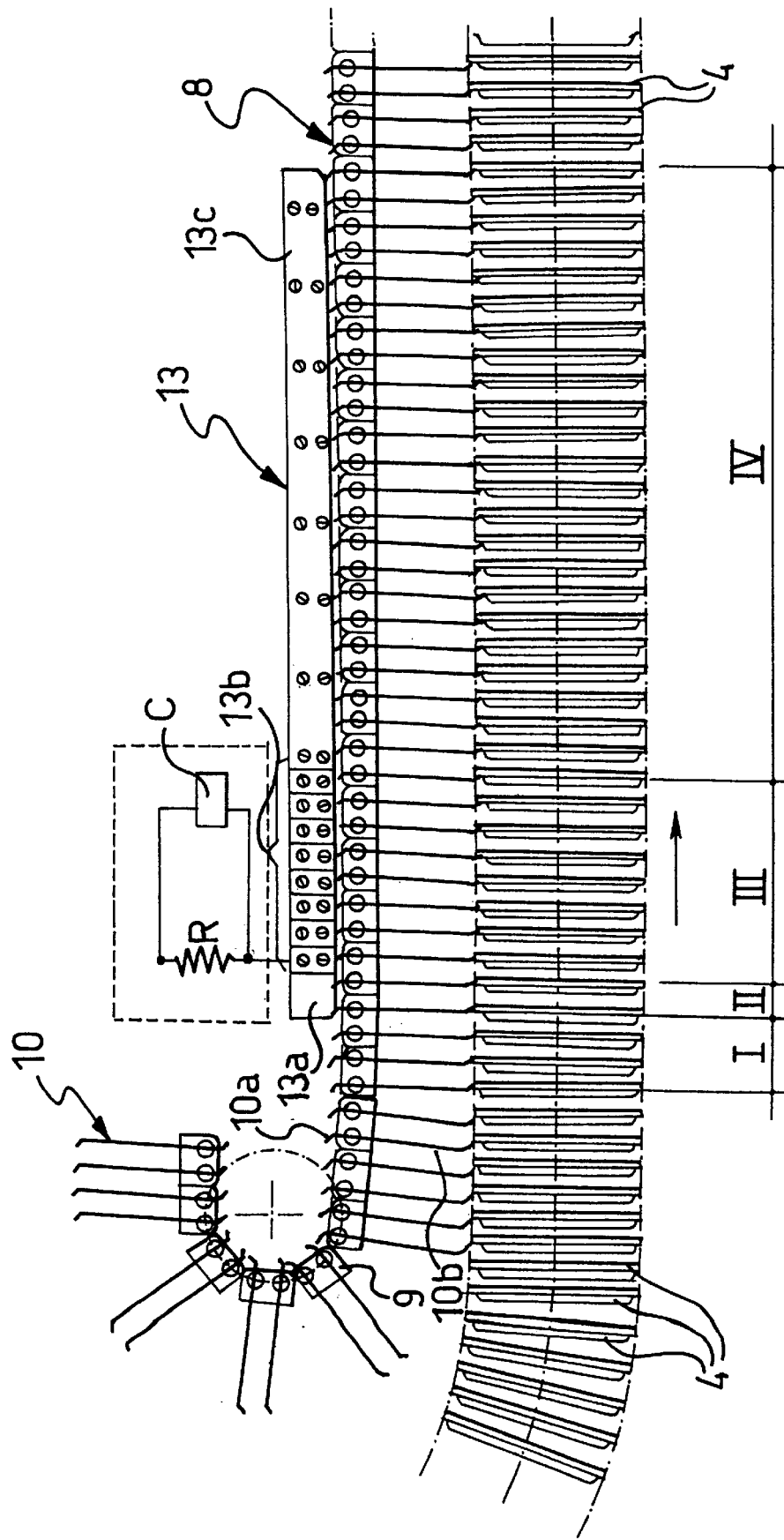

MACHINE FOR THE ELECTROPHORETIC RE-PAINTING OR RE-VARNISHING OF THIN METAL OBJECTS

FIELD OF THE INVENTION

The present invention relates to a machine for the electrophoretic painting or varnishing of thin metal objects such as, for example, lids for food containers, comprising a tank for the electrophoretic-bath, extending along a longitudinal axis, a conveyor line for the metal objects, immersed in the tank for the electrophoretic bath, an electrode immersed in the bath, and a system of electrodes of opposite polarity to the electrode immersed in the bath.

BACKGROUND ART

As is well known, thin metal lids are produced by blanking operations from thin metal sheets which are normally already painted or varnished. In many applications, particularly in the food-preservation field, "easy-to-open" metal cans are used. This term generally means metal cans the lids of which normally have a pull tab and a predetermined break line, and which can be opened without the need for additional tools. In order to create the predetermined break line, the already-painted or varnished lids are cut on the surface which is to be the outer surface; this operation consequently creates a cracking or breakage of the film of paint or varnish on the cut portions, which are thus exposed.

To prevent corrosion due to the pasteurization processes as well as simply due to atmospheric agents, the exposed portions of the cut lids have to be re-painted or re-varnished.

Two techniques are currently known for this painting or varnishing step; the first uses painting or varnishing by atomization, and the second uses painting or varnishing by electrophoresis. The second technique is considered without doubt the best since it ensures that all of the uncovered metal parts are fully painted or varnished.

A known machine for the electrophoretic painting or varnishing of thin metal lids uses, as an anode unit, a thin, flexible element which bears on the rims of the edges of the lids to be painted or varnished which have been exposed by the blanking operation. The lids to be painted or varnished travel in a horizonal position on a conveyor line for the lids and the flexible elements are moved at the same speed, maintaining contact with the lids throughout the period during which they pass through the electrophoretic bath. The anode unit, which consists of a wire or metal strip, follows an endless path with respective guides and drive pulleys.

However, the machine just described has a fairly important disadvantage; the wire constituting the anode is immersed in the electrophoretic bath, and is therefore covered with a large amount of paint or varnish which cannot be removed and which irreparably soils the guides and the drive means for the wire. Moreover, the wire constituting the anode is under tension along the entire endless circuit, causing well-known problems of premature wear of the guide and return elements owing to electrical erosion.

A further disadvantage of this machine is the system for transporting the lids. In fact it must be borne in mind that the transportation of the lids in a horizontal position prevents perfect painting or varnishing since the oxygen which forms in the vicinity of the lower surface of the lid during anaphoresis remains incorporated under the lid, in addition to any air already trapped by the bell effect of the concave side of the lid which faces downwardly at the moment of immersion, thus creating an insulating cushion which partially prevents the deposition of paint or varnish on the metal object.

Moreover, since the conveyor line for the lids necessarily has to be horizontal, the tank for the electrophoretic bath has to have two openings for allowing the conveyor line for the lids to enter and leave the tank, respectively. Clearly, these two openings have to be below the level of the electrophoretic bath, thus causing a continual leakage of liquid. The machine described above therefore requires a system for circulating the liquid which has leaked from the electrophoretic tank, thus increasing the structural complexity of the machine.

To prevent the problem of the deposition of paint or varnish on guides and pulleys caused by the wire constituting the anode of the machine described above, a further known machine for the electrophoretic painting or varnishing of thin metal objects, substantially similar to that just described, comprises an anode system constituted by a metal conveyor chain having a plurality of appendages each of which is intended to contact a respective lid to be polarized. Only the appendages of the anode system are therefore immersed in the electrophoretic bath, preventing paint or varnish from being carried along by the wire.

With the construction of the machine just described, however, the other problems mentioned above still remain unsolved, that is, wear due to electrical erosion, the painting or varnishing problems connected with the horizontal transportation of the lids, and the need for the machine to be rendered more complex by a system for recycling the paint or varnish which continually leaks from the electrophoretic tank.

SUMMARY OF THE INVENTION

The problem upon which the invention is based is therefore that of providing a machine for painting or varnishing thin metal objects, particularly lids, which can deal with all of the problems discussed above. The term "thin metal objects" is intended to define any metal object extending principally in one plane.

The problem is solved by means of a machine for the electrophoretic painting or varnishing of thin metal objects such as, for example, lids for food containers, comprising a tank for the electrophoretic bath, extending along a longitudinal axis, a conveyor line for the metal objects, immersed in the tank for the electrophoretic bath, an electrode immersed in the bath, and a system of electrodes of opposite polarity to the electrode immersed in the bath, characterized in that it comprises means for securing the metal objects, the securing means being able to keep the plane containing each metal object in a position substantially perpendicular to the direction of movement of the conveyor line for the lids.

BRIEF DESCRIPTION OF THE DRAWINGS

The machine according to the invention has further advantageous characteristics which will become clear from the following description of a preferred embodiment of the present invention given with reference to the appended drawings, in which:

FIG. 5 is a detail of FIG. 1 showing the various stages of contact between the anode unit and the lids to be painted or varnished.

DETAILED DESCRIPTION OF THE INVENTION

Figure 1:
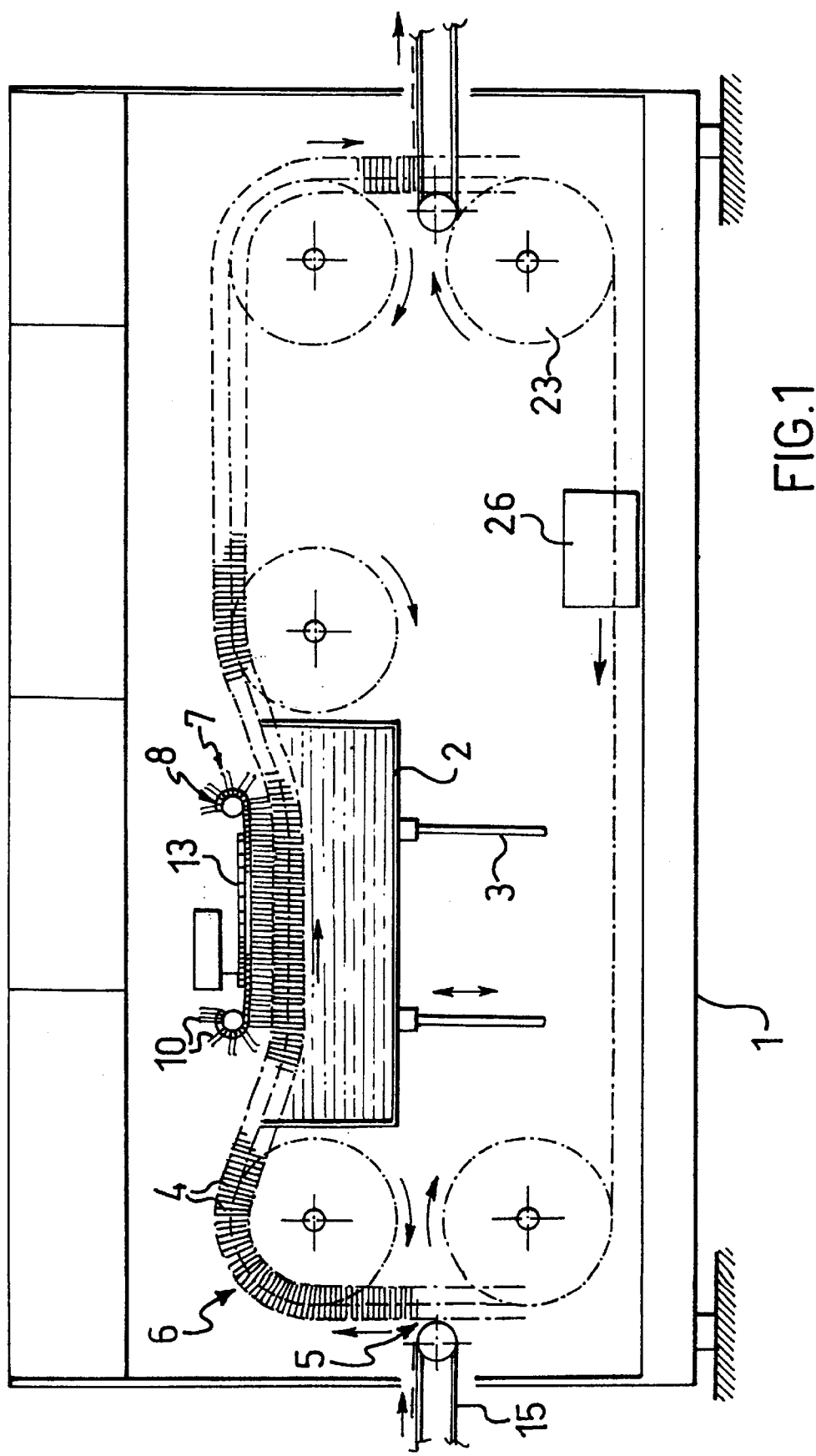
FIG. 1 is a partially-sectioned schematic side view of an embodiment of the present invention.

With reference to FIG. 1, the electrophoretic painting or varnishing machine comprises a rigid frame 1 containing a tank 2 for the electrophoretic bath, supported and movable vertically by means of a lifting fork 3. The lids 4 to be painted or varnished electrophoretically are moved by means of a conveyor line 6 from a supply station 5 into the tank 2 for the electrophoretic bath in which they come into contact with an anode unit 7 comprising a plurality of polarizable resilient strips 10 traveling on a chain member 8 at the same speed as the lids. At the moment when the resilient strips 10 leave the tank 2 for the electrophoretic bath, they are moved away from the painted or varnished lids 4 which are taken to a baking oven (not shown) for fixing the paint or varnish. The machine further comprises an ultrasound washing device 26 for cleaning the conveyor line 6, during its return stage, of any deposits caused by the deposition of electrophoretic liquid thereon.

Figure 2:
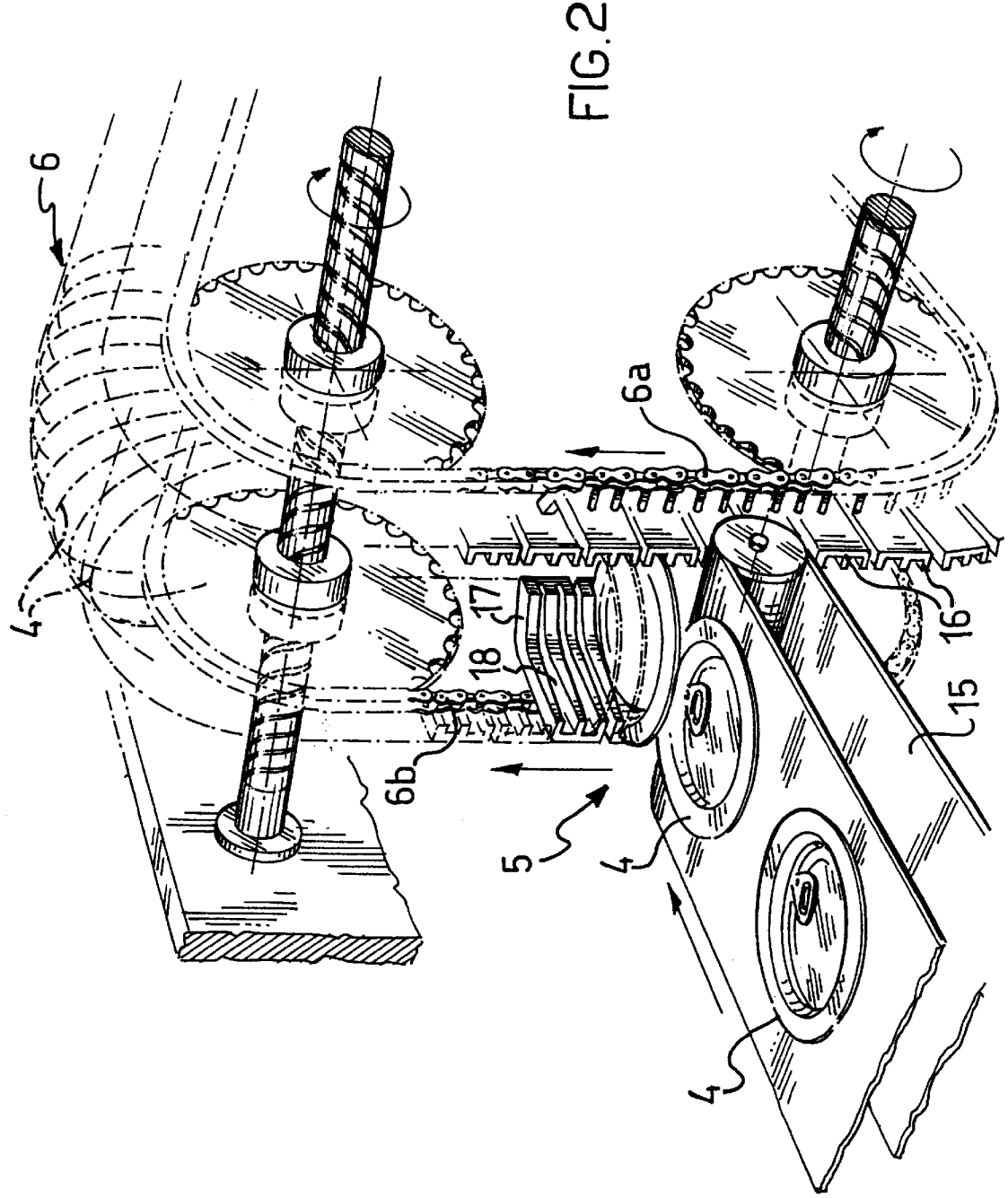
FIG. 2 is a detail of FIG. 1, showing the lid-supply station.
Figure 3:
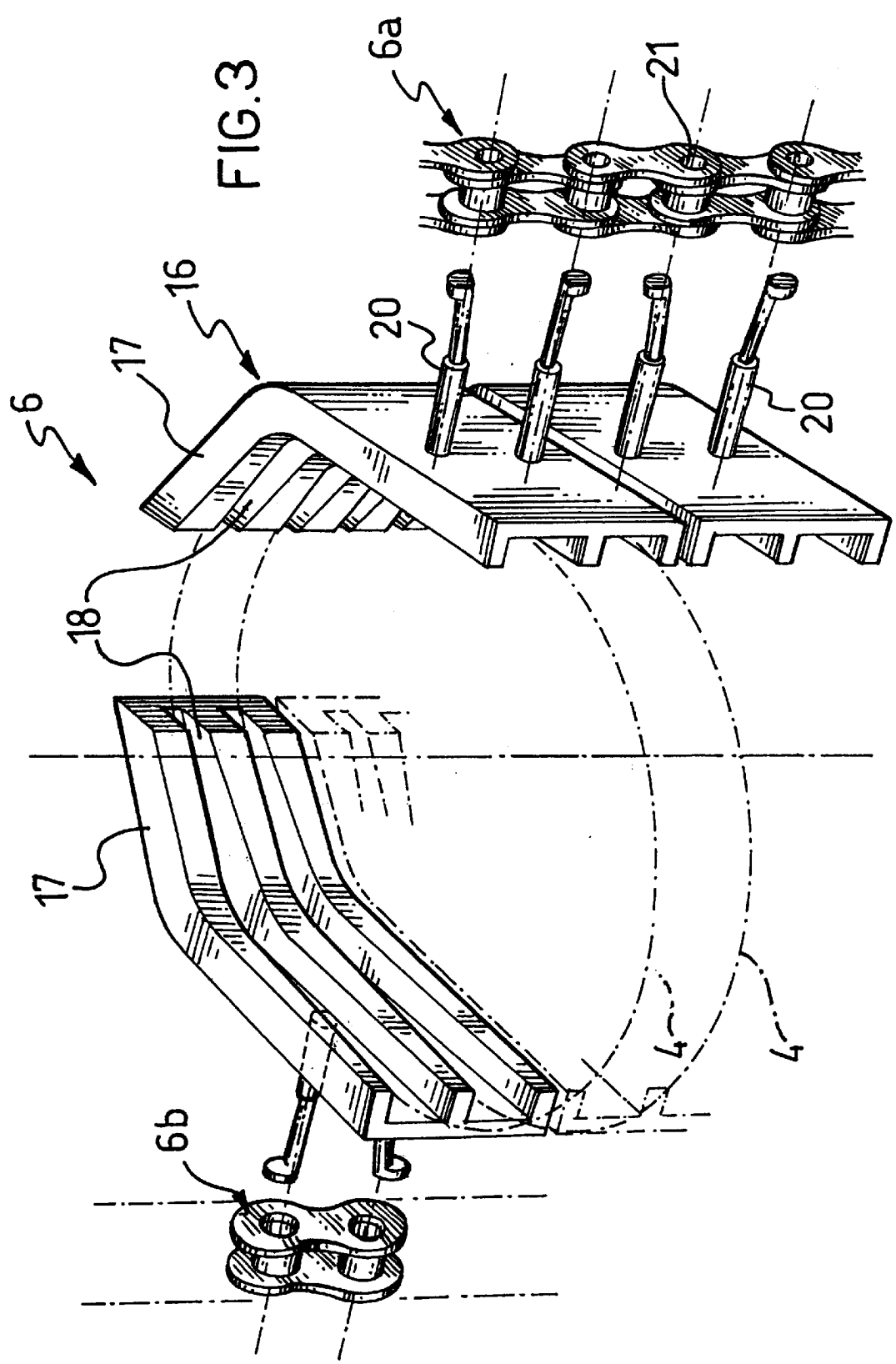
FIG. 3 is a detail of FIG. 1 showing the means for securing the lids to be painted or varnished to the conveyor chain.

With reference to FIG. 2, the lids 4 to be painted or varnished are loaded onto the conveyor line 6 for the lids 4, in the supply station 5, by means of a conveyor belt 15, and are clamped by securing means 16. As shown in FIG. 3, the securing means 16 comprise pairs of lateral supports 17 each comprising a linear portion and an angled end, enabling the lids to maintain a position substantially perpendicular to the direction of movement of the conveyor line 6 for the lids throughout its path as far as the baking oven. The conveyor line 6 for the lids 4 as a whole thus has flexibility characteristics which allow it to follow the path shown in FIG. 1.

Figure 4:
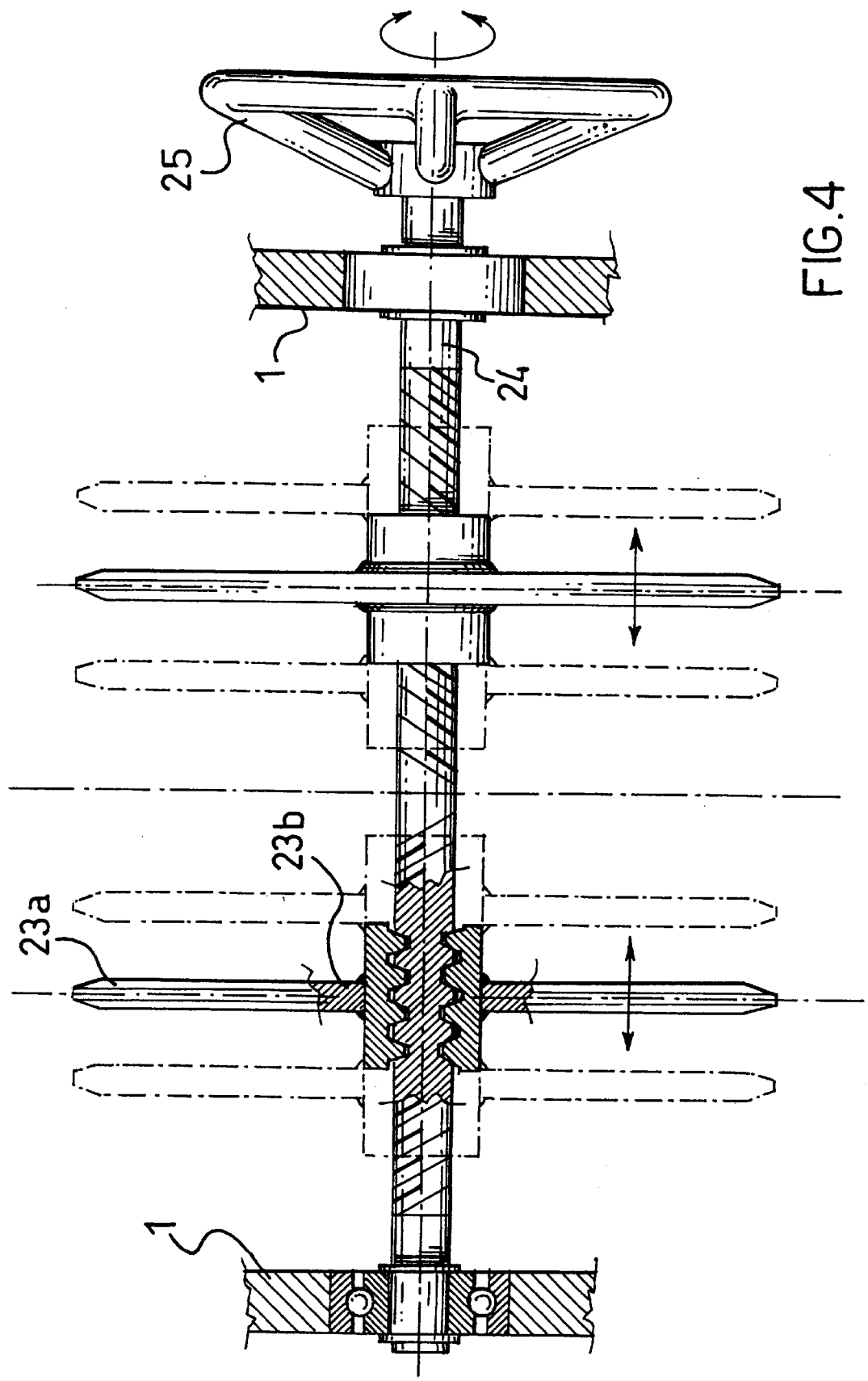
FIG. 4 is a detail of FIG. 1 showing the system for adjusting the distance between each pair of pinions.

Still with reference to FIG. 3, the conveyor line 6 comprises two chains 6a and 6b with hollow pins 21, the chains being movable parallel to one another and being supported by five pairs of pinions 23 (FIG. 1) each comprising, as shown in FIG. 4, a chain wheel 23a supported for rotation on a hub 23b. The pairs of lateral supports 17 are fixed to the chains 6a and 6b, opposite and facing one another. Each lateral support 17 comprises a plurality of channels 18 which extend and become narrower from the linear portion towards the angled end of the lateral support 17. Each lateral support 17 also comprises, on the opposite side to the channels 18, two substantially hook-shaped appendages 20 which have an interaxial spacing substantially greater than that of the hollow pins 21 of the chains 6a and 6b and which, by virtue of this characteristic, can be inserted and snap-engaged in the hollow pins 21. The securing means 16 are mounted on the chains 6a and 6b in a manner such that the plane in which the lids 4 are fitted in the channels 18 is substantially perpendicular to the direction of travel of the chains 6a and 6b. Alternatively, the lateral supports 17 and the respective chains 6a and 6b may be held together by screws or by other known fixing means.

With reference again to FIG. 2, the lids coming from the conveyor belt 15 are fitted in sequence and in a synchronized manner in respective pairs of opposed channels 18, traveling on the conveyor line 6. Since the channels 18 become narrower at the angled end, they keep the lids clamped, ensuring their transportation even at high speed. Moreover, the angled ends of the channels 18 positively ensure that the lids 4 are clamped when they are in a vertical position, thus preventing them from falling into the electrophoretic bath. The distance between the opposed lateral supports 17 may be varied in order to transport lids of different sizes. For this purpose, as shown in FIG. 4, the hubs 23b of each pair of pinions 23 are mounted coaxially on a pin 24 supported for rotation by the frame 1 of the machine and are associated with the pin by means of a male-and-female screw connection, one of the couplings having a right-hand thread and the other a left-hand thread. The rotation of a hand wheel 25 associated with one end of the pin 24 enables the pinions to move along the pin symmetrically with respect to the median axis of the conveyor line 6, increasing or reducing the distance between the chains 6a and 6b.

With reference to FIG. 5, the lids 4 coming from the supply station 5 to be painted or varnished contact the resilient strips 10 traveling on the chain member 8 at the same speed as the conveyor line 6 for the lids 4 and in synchronism therewith. The resilient strips 10 are fixed in pairs to support blocks 9 of electrically non-conductive material with which the links of the chain member 8 are provided. Each resilient strip 10 comprises a first end 10a for contacting an electrically-polarized, bar-like element 13 and a second end 10b for contacting a respective lid to be painted or varnished, moving on the conveyor line 6. Still with reference to FIG. 5, the polarization of the lids 4 by means of the resilient strips 10 takes place in four stages along a portion of the chain member 8. This portion defines an operative pass of the chain member 8, which is parallel to the longitudinal axis of the electrophoretic-bath tank 2 (FIG. 1), and which is characterized by contact between the resilient strips 10 and the lids 4; during stage I, the end 10b of the resilient strip 10 progressively approaches the cut edge of the lid 4 and comes into physical contact therewith. During steps I and II the strip and the edge of the lid travel in contact whereas the end 10a of the resilient strip 10 remains free during stage I and comes into physical contact with the insulated end portion 13a of the polarized bar-like element 13 during stage II. During stage III, which is again characterized by contact between the end 10b and the lid, the end 10a comes into physical contact with a first section of a sectional, polarized portion 13b of the electrically-polarized, bar-like element 13, thus allowing current to pass through the resilient strip 10, starting the electrophoresis. Finally, during stage IV, the end 10a comes into contact with a portion 13c of the bar-like element 13 comprising a single polarized block.

As shown in FIG. 1, the electrically-polarized bar-like element 13 extends parallel to the conveyor line 6 for the lids for at least a portion of the operative pass of the chain member. The sectional, polarized portion 13b comprises a plurality (generally from 4 to 8) of sections which are electrically insulated from one another and each of which is intended to contact a single end 10a at a time, whereas the portion 13c of the bar-like element 13 comprises a single polarized block. The first of the sections has a device 14 for monitoring the flow of current which proves that contact has taken place. The monitoring device 14 is constituted by a calibrated resistor R connected in series between a direct-current voltage generator (not shown) and the sections (generally between the voltage-generator and the first section) of the sectional, polarized portion 13b of the electrically-polarized, bar-like element 13, and by an electronic circuit C connected in parallel with the resistor R. The electronic circuit C may, for example comprise current transducers with photo-electronic couplers. The current-flow is tested by reading the voltage drop between the terminals of the calibrated resistor R by means of the electronic circuit C. If no current is supplied in a position occupied by lids, the circuit will provide a warning, thus permitting identification of the non-painted or non-varnished lid which, if required, may be expelled automatically from the production line before entering the oven.

The machine of the present invention for the electrophoretic painting or varnishing of thin metal objects has many advantages in comparison with machines of the prior art: the conveyor system for lids of the present invention completely solves the problems mentioned above with regard to the formation of a cushion of gas (oxygen) in the vicinity of the surface to be painted or varnished by keeping the lids in a substantially vertical position when they are immersed in the electrophoretic bath. A conveyor line which keeps the lids positioned substantially perpendicular to its direction of movement also permits a considerable increase in the time spent by each individual lid in the electrophoretic bath for a given productivity of the machine and size of the tank, since the speed of the conveyor line can be reduced. This aspect is very important since, in electrophoresis processes, it is necessary for the lids to spend a fairly long time in the bath in order to achieve high-quality painting or varnishing which is resistant to the subsequent heat treatments. Moreover, a reduction in the speed of movement of the lids through the tank for the electrophoretic bath reduces the formation of foam which prevents correct painting or varnishing of the lids.

Moreover, the entire conveyor line for lids of the present invention has a certain flexibility by virtue of the structure of the securing means 16 in separate blocks and by virtue of the chains 6a, 6b, and can thus follow very varied paths, according to need. This characteristic of the conveyor line for the lids is particularly advantageous since it enables the lids to be introduced into the tank for the electrophoretic bath from the rim of the tank (FIG. 1), thus eliminating the problem of the need to create two openings in the walls of the tank for the electrophoretic bath through which the conveyor line for the lids can enter and leave, thus avoiding the continual leakage of paint or varnish.

There is therefore no need to introduce into the machine a system for circulating the paint or varnish which has leaked from the electrophoretic tank, and the structural characteristics of the machine are thus considerably simplified. The anode unit of the present invention is polarized only in a well-defined portion of the anode conveyor line, that is, only whilst contact is maintained between the resilient strips and the respective lids. As well as making the machine as a whole safer, the fact that the anode conveyor line is insulated at all of its points except during electrophoresis has the enormous advantage of protecting the anode conveyor line from elongation phenomena caused by premature wear due to electrical erosion of the elements such as chains, pulleys and guides. Moreover, the presence of devices for checking that contact has taken place enables a high-quality product to be produced, since these devices enable incorrectly non-painted or non-varnished pieces to be identified immediately. Clearly, the anode unit, modified as described above, could also be applied to conventional machines for the electrophoretic re-painting or re-varnishing of thin metal objects, that is, to machines in which the conveyor system for the objects is similar to that described in the introductory part of the present description with reference to machines of the prior art. In this case, it will suffice to apply to the device small modifications which are within the normal capabilities of experts in the art.

In general, in order to satisfy further and contingent requirements, an expert in the art may apply many modifications and variations to the above-described electrophoretic painting or varnishing machine without, however, departing from the scope of the invention. For example, by arranging the electrically-polarized, bar-like element 13 in a suitable manner relative to the chain member 8, it is possible to arrange for the contact between the end 10b of the strip 10 and the respective lid to be painted or varnished to take place simultaneously with the contact between the end 10a and the first section of the sectional, polarized portion 13b. Similarly, the contact between the end 10b of the strip and the respective lid to be painted or varnished may occur after contact has taken place between the end 10a and the first section of the sectional, polarized portion 13b.

The embodiment described above performs an anaphoretic painting or varnishing process; clearly, however, the present invention may also be applied to cataphoretic processes, simply by reversal of the polarity of the two electrodes.

What is claimed is:

1. A machine for the electrophoretic painting or varnishing of thin metal objects, comprising:

a tank containing an electrophoretic bath, extending along a longitudinal axis;

a first electrode immersed in said bath;

a system of second electrodes of opposite polarity to said first electrode;

a conveyor line for the metal objects for continuously supplying the metal objects to said bath, said conveyor line being partially immersed in said tank for the electrophoretic bath; and means for securing the metal objects, said securing means being constructed to keep the plane containing each metal object in a position substantially perpendicular to the direction of movement of said conveyor line throughout its path.

2. A machine according to claim 1, wherein said first electrode immersed in the bath is a cathode and the system of second electrodes is an anode unit.

3. A machine according to claim 2, wherein the conveyor line comprises two chains with hollow pins, the chains traveling parallel to one another and being supported by pairs of pinions, each pinion comprising a hub and a chain wheel.

4. A machine according to claim 3, wherein the securing means comprise lateral supports each having a linear portion and an angled end, the lateral supports comprising channels which become narrower towards the angled end.

5. A machine according to claim 4, wherein the supports are fixed to the chains of the conveyor line by means of substantially hook-shaped appendages situated on the opposite side to the channels, the appendages snap-engaging in the hollow pins of the chains constituting the conveyor line.

6. A machine according to claim 2, wherein the anode unit comprises:

a chain member extending around a closed path defining an operative pass which is parallel to the longitudinal axis of the electrophoretic-bath tank and in which contact takes place between the anode unit and the metal lids, the chain member being formed by links having support blocks of non-electrically-conductive material, an electrically-polarized, bar element which extends parallel to the chain member for at least a portion of the operative pass of the chain member, a plurality of strips fixed to the support blocks of the links of the chain member and each comprising a first end for contacting said bar element and a second end for contacting the cut edge of a respective metal object to be painted or varnished, traveling on the conveyor line.

7. A machine according to claim 6, wherein the strips are resiliently flexible.

8. A machine according to claim 6, wherein the strips are fixed in pairs to the support blocks of the links constituting the chain member.

9. A machine according to claim 6, wherein the polarized bar element comprises a first, sectional, polarized portion which is divided, with reference to the direction of movement of the chain member, into a plurality of sections each of which is intended to contact a single end of a strip at a time, and which are electrically insulated from one another, and a final portion constituted by a single polarized block.

10. A machine according to claim 9, wherein it comprises means for monitoring the electrical polarization of each metal object to be painted or varnished.

11. A machine according to claim 10, wherein the monitoring means comprise a resistor disposed between a voltage generator and the first section of the sectional, polarized portion of the polarized, bar element and an electronic circuit which is connected in parallel with the resistor and which can provide a signal confirming the electrical polarization of each metal object to be painted or varnished.

12. A machine according to claim 1, wherein the conveyor line comprises two chains with hollow pins, the chains traveling parallel to one another and being supported by pairs of pinions, each pinion comprising a hub and a chain wheel.

13. A machine according to claim 12, wherein the securing means comprise lateral supports each having a linear portion and an angled end, the lateral supports comprising channels which become narrower towards the angled end.

14. A machine according to claim 13, wherein the supports are fixed to the chains of the conveyor line by means of substantially hook-shaped appendages situated on the opposite side to the channels, the appendages snap-engaging in the hollow pins of the chains constituting the conveyor line.

* * * * *